(12) United States Patent
Merrell et al.

(10) Patent No.: US 10,831,308 B2
(45) Date of Patent: Nov. 10, 2020

(54) TOUCH GESTURE DETECTION AND RESOLUTION

(71) Applicant: Motorola Mobility LLC, Chicago, IL (US)

(72) Inventors: Thomas Merrell, Chicago, IL (US); John Joseph Gorsica, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/186,138

(22) Filed: Nov. 9, 2018

(65) Prior Publication Data

US 2020/0150816 A1 May 14, 2020

(51) Int. Cl.
*G06F 3/041* (2006.01)
*G06F 3/0488* (2013.01)
*G06F 3/01* (2006.01)

(52) U.S. Cl.
CPC ............ *G06F 3/0416* (2013.01); *G06F 3/016* (2013.01); *G06F 3/04883* (2013.01); *G06F 3/041661* (2019.05)

(58) Field of Classification Search
CPC .. G06F 3/0416; G06F 3/016; G06F 3/041661; G06F 3/04883
See application file for complete search history.

(56) References Cited

U.S. PATENT DOCUMENTS

| | | | | |
|---|---|---|---|---|
| 2002/0054695 A1* | 5/2002 | Bjorn | .................. | G06F 3/03547 382/124 |
| 2012/0218192 A1* | 8/2012 | Lazaridis | .............. | G06F 1/1626 345/173 |
| 2012/0256845 A1* | 10/2012 | Noble | ..................... | G06F 3/016 345/173 |
| 2013/0212515 A1* | 8/2013 | Eleftheriou | ......... | G06F 3/04883 715/773 |
| 2013/0265276 A1* | 10/2013 | Obeidat | .................. | G06F 3/044 345/174 |
| 2014/0049505 A1* | 2/2014 | Radivojevic | ........ | G06F 3/04883 345/174 |
| 2014/0160085 A1* | 6/2014 | Rabii | .................... | G06F 1/3262 345/178 |
| 2014/0168104 A1* | 6/2014 | Zhou | ..................... | G06F 3/0416 345/173 |

\* cited by examiner

*Primary Examiner* — Stephen G Sherman
(74) *Attorney, Agent, or Firm* — McKinney Phillips LLC; Phillip Pippenger (57) ABSTRACT

Systems and methods for enhanced touch gesture detection and resolution in mobile electronic communications devices entail scanning a touch sensor of the device at a first scan rate, detecting a touch of a finger and determining that the touch has remained present for at least a first threshold period. In response to this determination, the touch sensor is scanned at a second scan rate that is higher than the first scan rate, and it is determined using this second scan rate that a swipe gesture has occurred at the touch sensor within a second threshold period. In response to the swipe gesture, an action is executed at the device.

20 Claims, 5 Drawing Sheets

TOUCH GESTURE DETECTION AND RESOLUTION

TECHNICAL FIELD

The present disclosure is related generally to mobile electronic communications devices and, more particularly, to systems and methods for facilitating user touch interactions with a user interface of a mobile electronic communications device.

BACKGROUND

Mobile devices, such as cell phones and smart phones, generally have touch-sensitive input devices, e.g., touchpads or fingerprint sensors. As a result, users of mobile communications devices have become accustomed to using a finger swipe as a common input gesture. However, in practice, swipe gestures can occur very quickly, so that in order for the device to capture, and thus interpret, the entire attempted gesture, the device must sample the sensor at a very high rate.

While over-sampling may be used and may be effective, it comes at the cost of increased power consumption due to the high rate of sampling. Since size and weight constraints severely limit battery capacity in mobile devices, battery power is a managed resource. Furthermore, unintentional swipe gestures can still be produced by a user's hand inadvertently glancing off the sensor. Such false gestures could change a device's settings or state, causing apparent malfunction and resultant user dissatisfaction.

Before proceeding to the remainder of this disclosure, it should be appreciated that the disclosure may address some or all of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objectives and advantages, may be best understood from the following detailed description taken in conjunction with the accompanying drawings of which:

DETAILED DESCRIPTION

Before presenting a detailed discussion of embodiments of the disclosed principles, an overview of certain embodiments is given to aid the reader in understanding the later more detailed discussion. As noted above, touchpads and similar systems sense a user's finger by scanning a matrix of possible touch locations. As a finger moves across a two-dimensional surface such as the device screen, the finger is tracked for position and velocity.

This data is then consumed by a swipe detection algorithm that outputs the direction and speed of any detected swipes. Similarly, fingerprint sensors detect finger features by scanning receivers on the two-dimensional sensor's surface (or a covering surface). These features are then analyzed and mapped. As a finger moves, an algorithm can track the movement of the previously detected features. This algorithm outputs the relative distance, velocity, and direction of movement. This can then be fed into a swipe detection algorithm that reports the direction and speed of any detected swipes. In either case, it is beneficial for the sensor to scan at a rate much higher than the frequency of movement, so as to be able to fully track any movement. For example, if a device performs a 1 Hz scan but the finger swipe takes 500 ms, the swipe might appear as nothing at all, or it may appear as a tap.

However, as noted above, the continual higher scan rate requires higher power which may be prohibitive for mobile applications. Therefore it is desirable to lower the scan rate when the user is not actively touching the sensor. However, this power savings also comes at a cost, namely latency. That is, the lower the standby scan rate, the longer it will take to detect the presence of a finger in order to then increase the sample rate. Thus, for very rapid finger swipes, the gesture might be entirely missed between standby scans.

In an embodiment of the disclosed principles, a fingerprint sensor "long touch" (authentication) is used as an enabler to then accept touch gestures such as swipes and other touch gestures. In a further embodiment, a gesture timeout is implemented following authentication to avoid false gesture recognition, For example, if a finger touch is inadvertent, then in general no gesture will be executed or registered before the timeout has expired, and the device can then return to low power mode. This is true even if the touch is still present. In this way, the device reduces the scan rate when the sensor is not being touched, and selectively increases the scan rate following finger authentication, allowing the device to then capture any subsequent gesture motion more accurately.

With this overview in mind, and turning now to a more detailed discussion in conjunction with the attached figures, the techniques of the present disclosure are illustrated as being implemented in or via a suitable device environment. The following device description is based on embodiments and examples within which or via which the disclosed principles may be implemented, and should not be taken as limiting the claims with regard to alternative embodiments that are not explicitly described herein.

Figure 1:
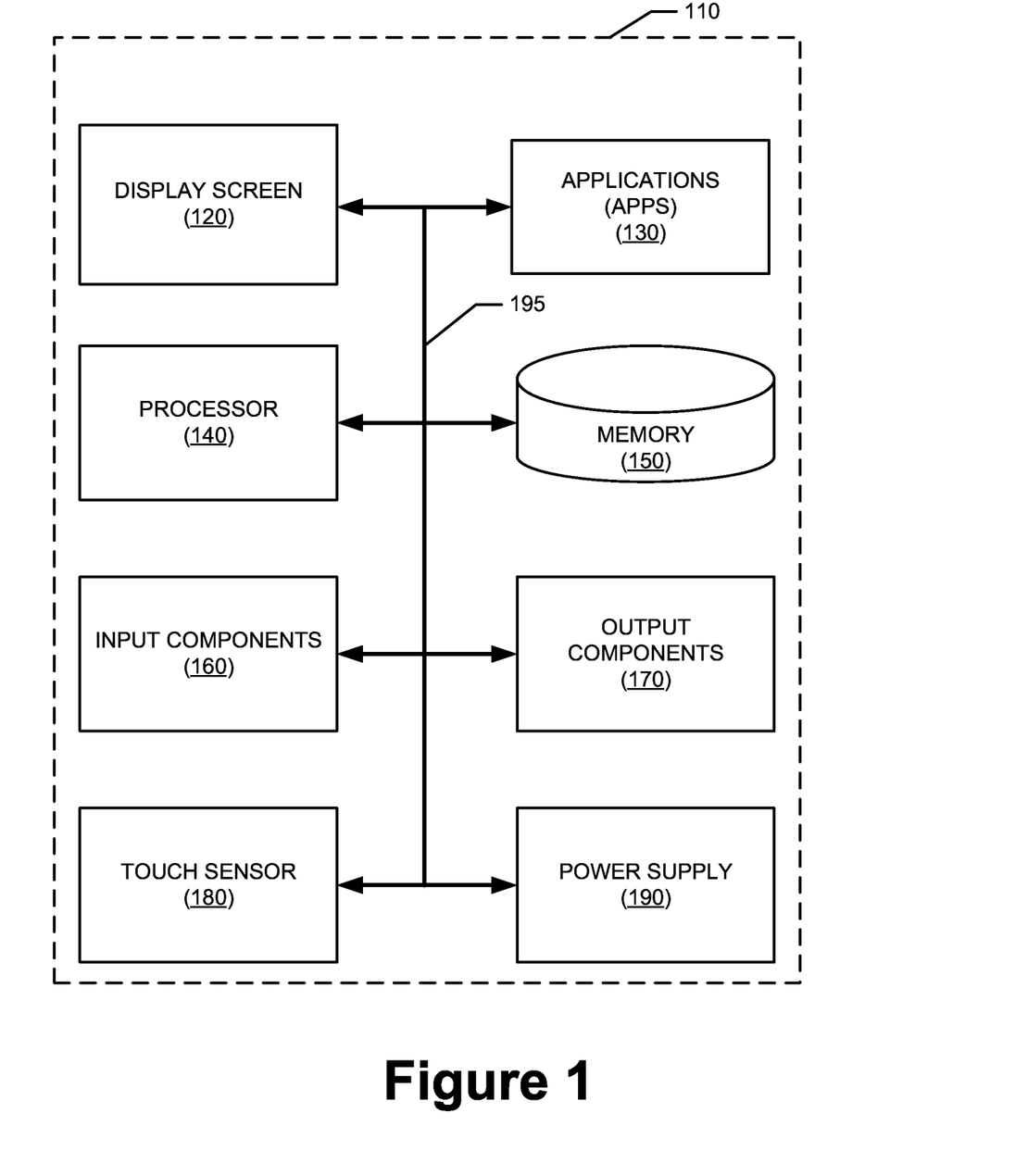
FIG. 1 is a general schematic representation of a mobile electronic device in which various embodiments of the disclosed principles may be implemented.

Thus, for example, while FIG. 1 illustrates an example mobile electronic communications device with respect to which embodiments of the disclosed principles may be implemented, it will be appreciated that other device types may be used, including but not limited to laptop computers, tablet computers, and so on. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example, one or more antennas and associated circuitry and logic. The antennas and associated circuitry may support any number of protocols, e.g., WiFi, Bluetooth, cellular, etc.

The device 110 as illustrated also includes one or more output components 170 such as RF (radio frequency) or wired output facilities. The RF output facilities may similarly support any number of protocols, e.g., WiFi, Bluetooth, cellular, etc., and may be the same as or overlapping with the associated input facilities. It will be appreciated that a single physical input may serve for both transmission and receipt.

The processor 140 can be a microprocessor, microcomputer, application-specific integrated circuit, or other suitable integrated circuit. For example, the processor 140 can be implemented via one or more microprocessors or controllers from any desired family or manufacturer. Similarly, the memory 150 is a nontransitory media that may (but need not) reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code (e.g., applications 130) associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules, these typically utilize the operating system to provide more specific functionality, such as file system service and handling of protected and unprotected data stored in the memory 150. In an embodiment, modules are software agents that include or interact with hardware components such as one or more sensors, and that manage the device 110's operations and interactions with respect to the described embodiments.

In an embodiment, one or more touch sensors 180 provide touch detection to detect a user's finger touch on, for example, the device screen. The touch sensor 180 may be part of the screen or may simply overlay or underlay the screen. In an embodiment, the touch sensor 180 is also configured to not only detect touch, but to identify a finger as such (as a finger and not another object) and optionally gather sufficient additional identifying indicia (e.g., fingerprint) to allow authentication of the finger as belonging or not belonging to an authorized user.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a power supply 190, such as a battery or fuel cell, is included for providing power to the device 110 and its components. Additionally or alternatively, the device 110 may be externally powered, e.g., by a vehicle battery, wall socket or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications). As noted above, the device 110 may include one or more display screens 120. These may include one or both of an integrated display and an external display and may or may not include the one or more touch sensors 180.

Figure 2:
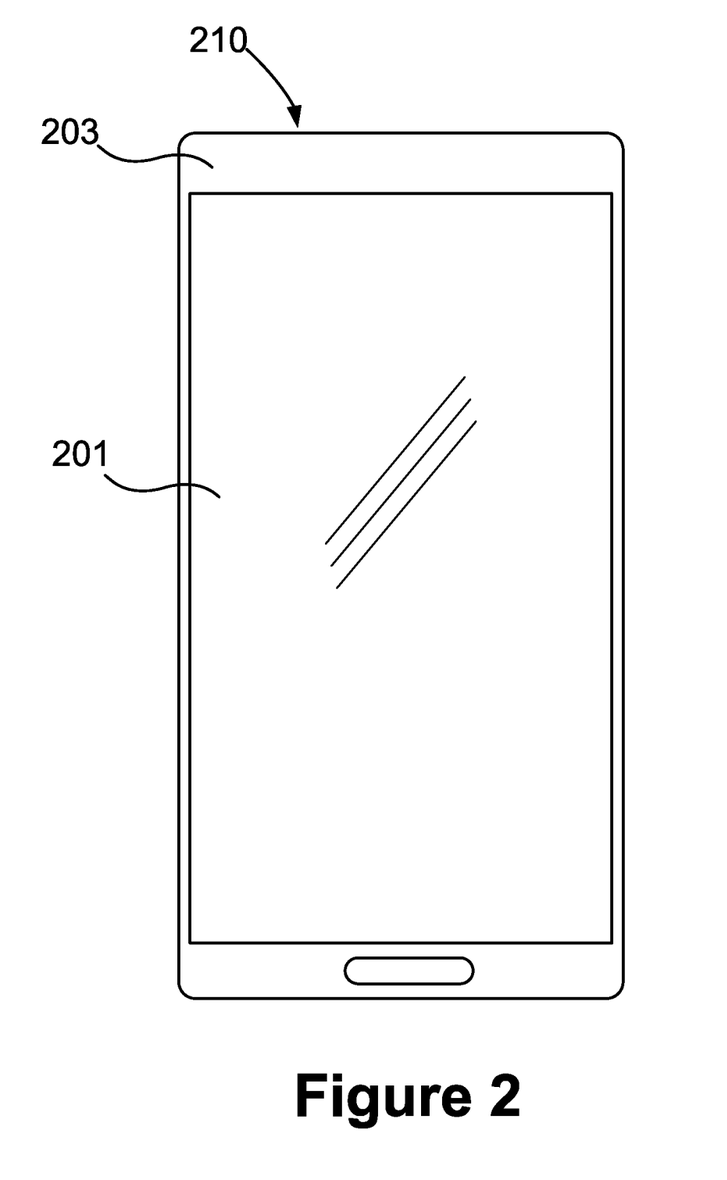
FIG. 2 is a front view of a device with which various embodiments of the disclosed principles may be implemented.

FIG. 2 is a front plan view of a device 210 (110) in accordance with the described principles. As can be seen, the device 210 includes a display 201 (120) within a device housing or body 203. In the illustrated example, the device display 201 is a touch-sensitive display configured to detect a user's touch, such as may occur during a swipe motion with a finger (left-to-right swipe example shown in figure). It will be appreciated that acceptable swipe gestures may be defined by the manufacturer of the device 210 or its software, or may be customized by the user, to include swipe direction (up, down, left, right) and associated meaning (return to home screen, open, close, drop menu etc.).

Figure 3:
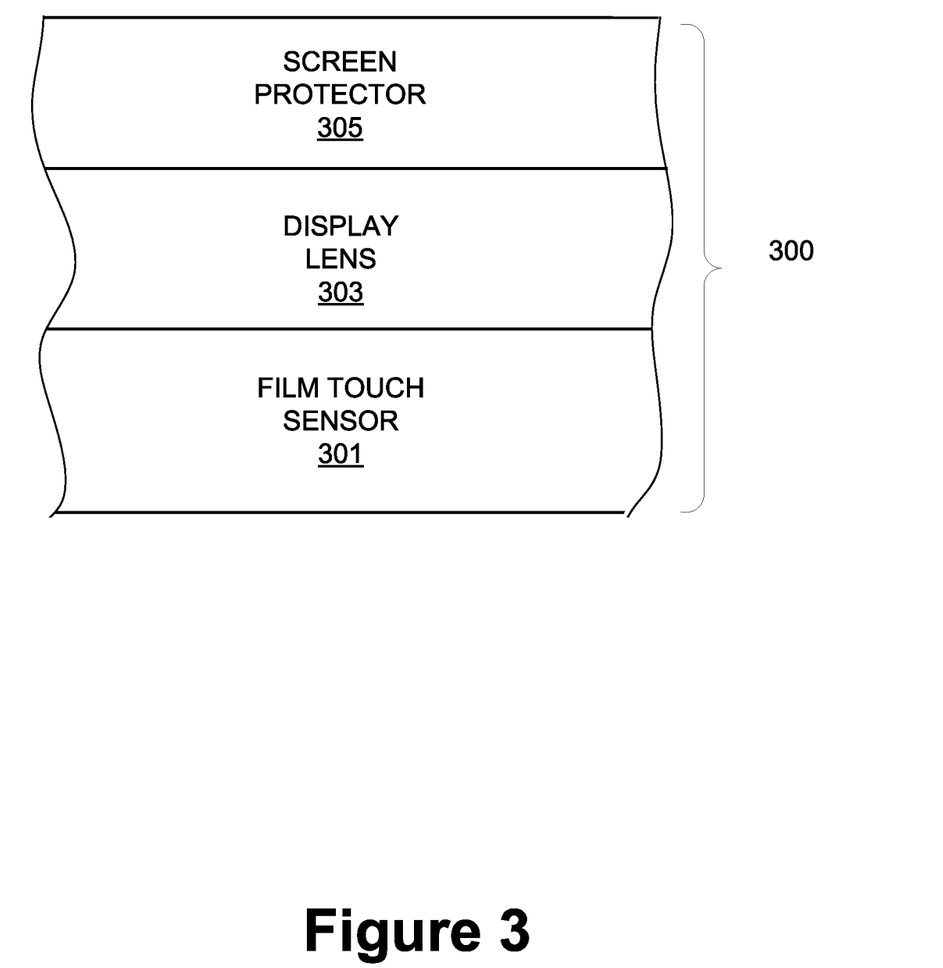
FIG. 3 is a cross-sectional layer diagram of a display screen assembly in accordance with an embodiment of the disclosed principles.

FIG. 3 is a cross-sectional layer diagram of a display screen assembly 300, such as the display 201 (120) or otherwise, usable within a device implementing one or more of the various described embodiments of the disclosed principles, such as the device 110 of FIG. 1 (device 210 of FIG. 2). In particular, example relationships between the various display assembly components in a layered screen structure are shown in partial cross-sectional view in FIG. 3.

The illustrated cross-section is taken perpendicularly through the screen region of the display 201 (FIG. 2). In order to focus on receptive aspects of the display, the image generation components of the display 201, e.g., LEDs or other light emitting portions, have been omitted. However, those of skill in the art will readily appreciate that such a display 201 will typically also include image generation components.

The display screen assembly 300 in the illustrated example is made up of a film touch sensor 301 covered by a display lens 303. Depending upon the material of the display lens 303, the display screen assembly 300 may also include a replaceable screen protector such as plastic screen protector 305, placed over the display lens 303. The display lens 303 and film touch sensor 301 taken together provide a touch sensitive display with which a user may interact. In particular, the user may execute a gesture such as a swipe on such a display, and generally may also activate user-selectable icons and features via user-touches in specified locations or fields.

Figure 4:
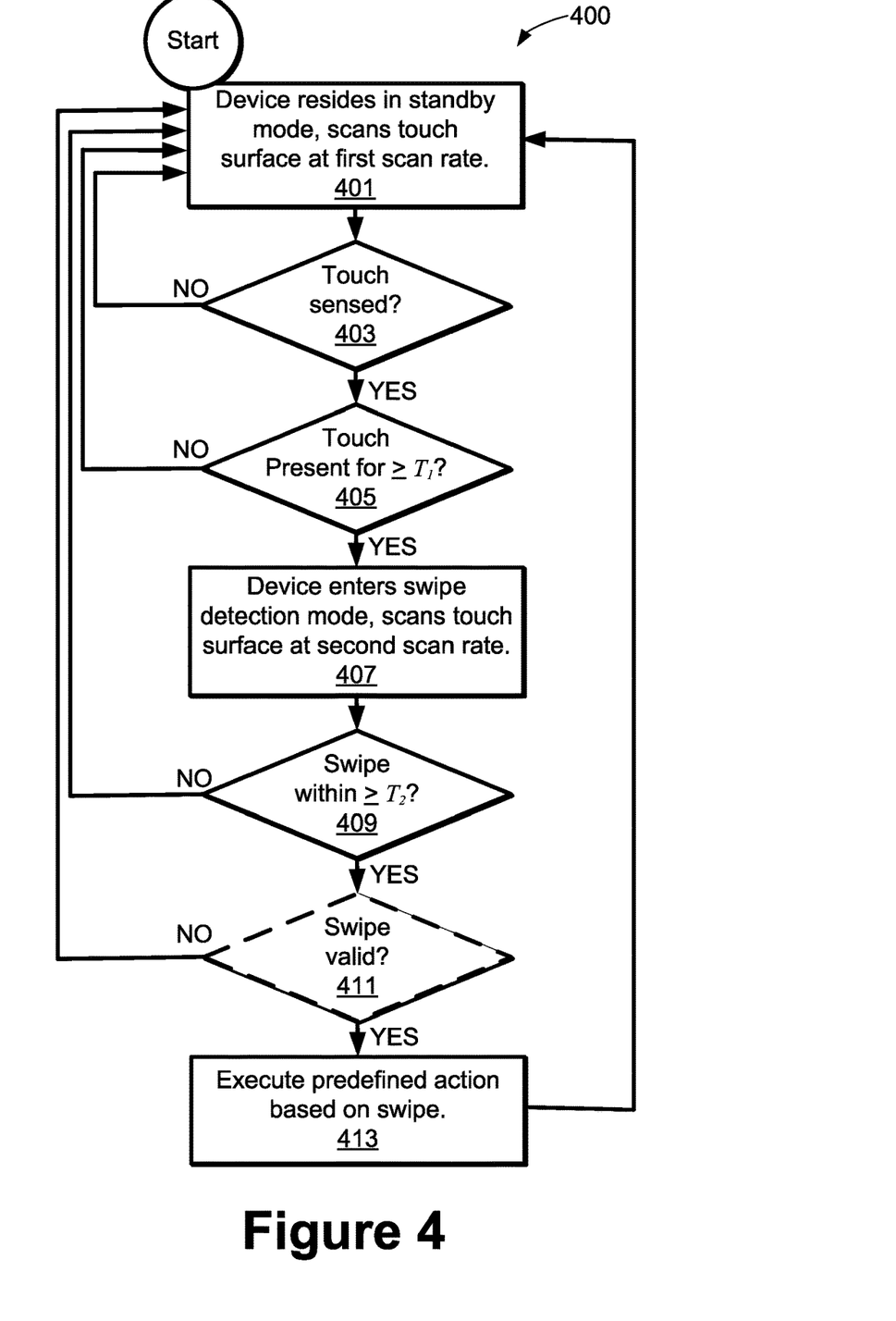
FIG. 4 is a flow chart showing a process of touch recognition and interpretation in accordance with an embodiment of the disclosed principles.

Turning to FIG. 4, this figure shows a flow chart of a process 400 by which the device 110 (210) may operate in accordance with the disclosed principles wherein a stationary touch on the sensor is used to enable rapid scanning for finger gestures, e.g., swipes, etc. The host device is assumed to be like or similar to that shown in FIGS. 1 and 2, although virtually any modern mobile communication device with touch sensing includes hardware that may be usable to execute the described method when properly configured.

At stage 401 of the process 400, the device resides in a standby state, periodically scanning the touch surface at a first scan rate. The first scan rate is slow enough that it is not suitable for reliably capturing a finger swipe executed at a normal speed, e.g., a swipe that starts and finishes within less than a second. An example of the first scan rate is 10 Hz, although this specific rate is not required.

At stage 403, the device determines whether a touch is present, and if a touch is not sensed at stage 403, the process 400 returns to stage 401. This loop continues, in an embodiment, until a touch is detected at stage 403. When a touch is detected at stage 403, the process then flows to stage 405, to determine whether or not the touch has remained present for at least a first threshold period of time ($T_1$), e.g., 500 ms or other suitable period. If the touch is lifted prior to expiration of the threshold period of time, then the process 400 returns to stage 401, to resume the standby mode.

Otherwise, if the touch remains for at least the threshold period $T_1$, the device enters a swipe detection mode at stage 407. In this mode, the device scans the touch surface at a second more rapid scan rate, suitable for reliably capturing a finger swipe that is executed at, or even faster than, a normal speed. The second scan rate may be, for example, 50 Hz, although it will be appreciated that other suitable rates may instead be used.

In the swipe detection mode, the device waits at stage 409 for up to a second threshold time period ($T_2$), e.g., 2 seconds, to detect a swipe. If no finger swipe is detected within the second threshold time period $T_2$, the process 400 returns to stage 401, whereupon it reverts to the standby scan rate. However, if instead a swipe is detected at stage 409 prior to expiration of the second threshold period $T_2$, then the process 400 optionally flows to stage 411 (and otherwise proceeds directly to stage 413), wherein the device determines whether the direction of the swipe is valid, e.g., left-to-right or other set direction or pattern.

If the swipe is valid, e.g., with respect to direction or other selected criteria of validity, the device executes a predefined action based on the swipe at stage 413 and, with respect to touch or swipe detection, returns to stand-by mode at stage 401. By way of example, the predefined action may be to open a particular application, enter a particular input or output mode, or other predefined action.

In an embodiment, as noted above, the touch sensor is, or comprises, a fingerprint sensor, e.g., a sensor that is configured to sense identifiable details about a finger as opposed to simply the presence or absence of an object on the screen. In this embodiment, the required extended initial touch allows time for the sensor to verify that the object interacting with it is indeed a finger and, further, to verify it as the finger of an authorized individual.

Figure 5:
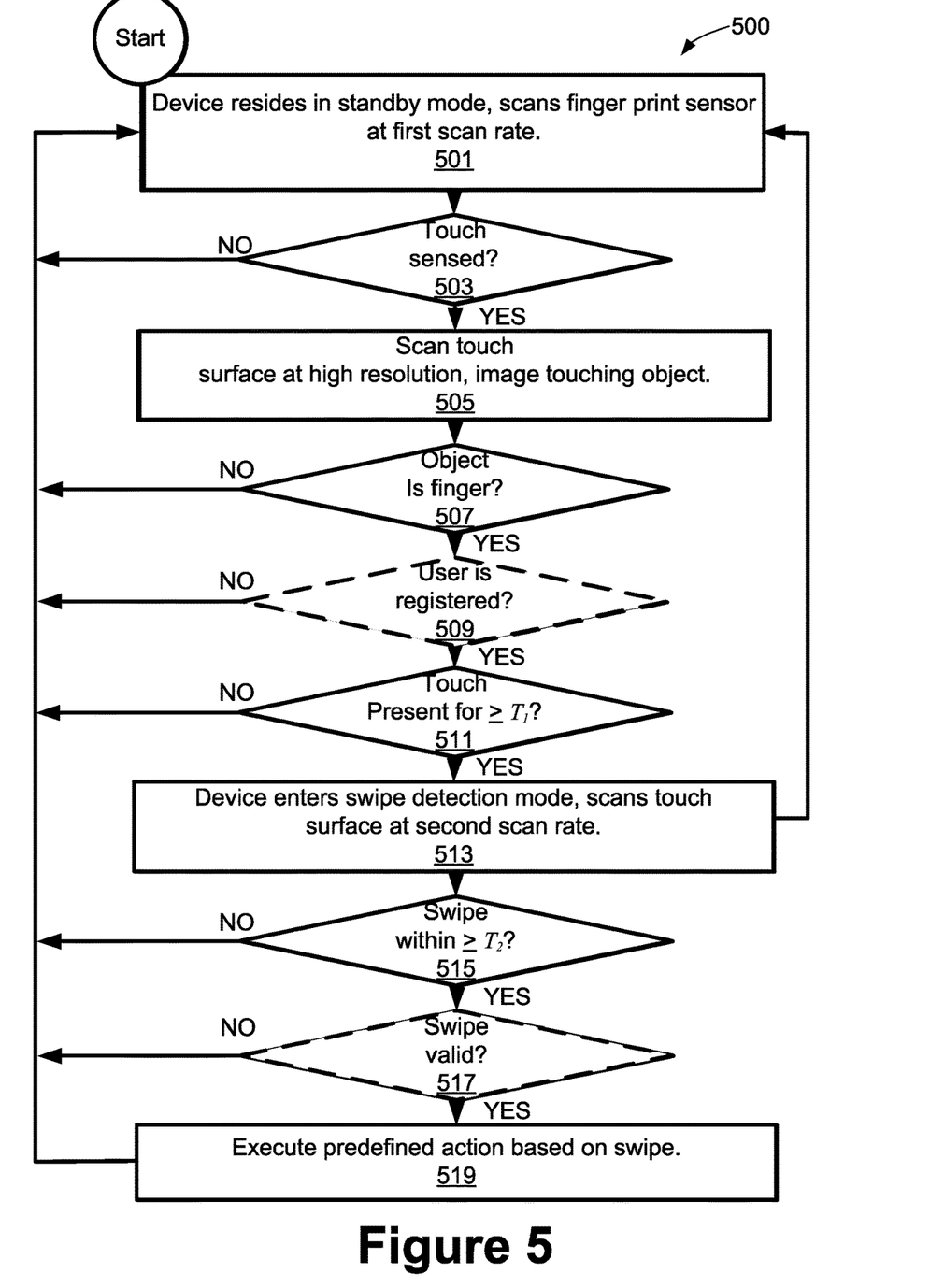
FIG. 5 is a flow chart showing a process in keeping with a further embodiment of the disclosed principles.

FIG. 5 provides a flow chart of operations in keeping with this embodiment, wherein user identification is optionally enabled. It will be appreciated by those of skill in the art that other sequences or variations of operations may be used within the disclosed principles. As with FIG. 4, the host device with respect to FIG. 5 is assumed to be like or similar to that shown in FIGS. 1 and 2, although virtually any modern mobile communication device with touch sensing includes hardware that may be usable to execute the described method when properly configured.

At stage 501 of the process 500, the device resides in a standby state, periodically scanning the fingerprint sensor surface at a first scan rate. The first scan rate is slow enough that it is not suitable for reliably capturing a finger swipe executed at a normal speed, e.g., a swipe that starts and finishes within less than a second. An example of the first scan rate is 10 Hz, although this specific rate is not required.

At stage 503, the device determines whether a touch is present, and if a touch is not sensed at stage 503, the process 500 returns to stage 501. This loop continues, in an embodiment, until a touch is detected at stage 503. When a touch is detected at stage 503, the process then flows to stage 505, wherein the screen is scanned at high resolution to image the touching object. The high resolution scan is then applied in stage 507 to determine whether the touching object is a finger or otherwise. If it is determined at stage 507 that the touching object is a finger, then the process 500 optionally flows to stage 509, wherein the device determines whether the finger is associated with an authorized (registered) user. For example, the owner of the device may have a fingerprint stored in their profile for automatic authentication and other identity-based functions. As noted above, stage 509 is optional and may alternatively be skipped.

If a negative determination is made at either of stages 507 and 509 (if applicable), then the process 500 returns to stage 501 to await further input. Otherwise, the process 500 flows to stage 511, to determine whether or not the touch has remained present for at least a first threshold period of time ($T_1$), e.g., 500 ms or other suitable period. If the touch is lifted prior to expiration of the threshold period of time, then the process 500 returns to stage 501, to resume the standby mode.

Otherwise, if the touch remains for at least the threshold period $T_1$, the device enters a swipe detection mode at stage 513. In this mode, the device scans the touch surface at a second more rapid scan rate, suitable for reliably capturing a finger swipe that is executed at, or even faster than, a normal speed. The second scan rate may be, for example, 50 Hz, although it will be appreciated that other suitable rates may instead be used.

In the swipe detection mode, the device waits at stage 515 for up to a second threshold time period ($T_2$), e.g., 2 seconds, to detect a swipe. If no finger swipe is detected within the second threshold time period $T_2$, the process 500 returns to stage 501, whereupon it reverts to the standby scan rate. However, if instead a swipe is detected at stage 515 prior to expiration of the second threshold period $T_2$, then the process 500 optionally flows to stage 517 (and otherwise proceeds directly to stage 519), wherein the device determines whether the direction of the swipe is valid, e.g., left-to-right or other set direction or pattern.

If the swipe is valid, e.g., with respect to direction or other selected criteria of validity, or if stage 517 is not implemented, the device executes a predefined action based on the swipe at stage 519 and, with respect to touch or swipe detection, returns to stand-by mode at stage 501. By way of example, the predefined action may be to open a particular application, enter a particular input or output mode, or other predefined action.

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A mobile electronic communications device having enhanced touch gesture detection and resolution, the mobile electronic communications device comprising:
a display screen configured to display visual information;
a touch sensor positioned and configured to sense touch on the display screen;
a processor linked to the touch sensor and configured to enter a standby state wherein the processor scans the touch sensor at a first scan rate, detects a single touch while scanning the touch sensor at the first scan rate, and in response, determines that the single touch has remained present for at least a first threshold period $T_1$, and in response to determining that the single touch has remained present for at least a first threshold period $T_1$, enter a swipe detection mode wherein the processor scans the touch sensor at a second scan rate that is higher than the first scan rate, determines that a swipe gesture has occurred at the touch sensor within a second threshold period $T_2$, and processes the swipe gesture.

2. The mobile electronic communications device in accordance with claim 1, wherein the processor is configured to process the swipe gesture by determining a trajectory of the swipe and designating the swipe as valid based on the trajectory of the swipe, the swipe trajectory including at least one of a swipe direction and a swipe pattern.

3. The mobile electronic communications device in accordance with claim 2, wherein the processor is configured to process the swipe gesture by executing a predefined action selected based on the swipe trajectory.

4. The mobile electronic communications device in accordance with claim 3, wherein the predefined action comprises opening an application on the device.

5. The mobile electronic communications device in accordance with claim 3, wherein the predefined action comprises putting the device into one of a predetermined input and a predetermined output mode.

6. The mobile electronic communications device in accordance with claim 3, wherein the predefined action comprises changing a setting of the device.

7. The mobile electronic communications device in accordance with claim 3, wherein the predefined action comprises controlling an operation of the device.

8. The mobile electronic communications device in accordance with claim 1, wherein the processor is further configured to determine, while in the swipe detection mode, that a swipe gesture has not occurred at the touch sensor within the second threshold period $T_2$, and to then return to the standby state.

9. The mobile electronic communications device in accordance with claim 1, wherein the processor is further configured to verify that the single touch is by a finger.

10. The mobile electronic communications device in accordance with claim 1, wherein the processor is further configured to detect a fingerprint via the touch sensor.

11. The mobile electronic communications device in accordance with claim 10, wherein the processor is further configured to verify that the detected fingerprint is associated with an authorized individual.

12. The mobile electronic communications device in accordance with claim 1, wherein the processor is configured to provide user feedback upon processing the swipe gesture.

13. The mobile electronic communications device in accordance with claim 12, wherein the user feedback comprises at least one of lighting a region of the device, providing haptic feedback via the device, and providing feedback via the device display screen.

14. A method in a mobile electronic communications device for enhanced touch gesture detection and resolution, the method comprising:
scanning a touch sensor of the device at a first scan rate and first resolution;
while scanning the touch sensor at the first scan rate, detecting a single touch;
scanning the touch sensor at a second resolution higher than the first resolution to determine that the single touch is a finger touch;
upon determining that the single touch is a finger touch, determining that the single touch has remained present for at least a first threshold period $T_1$;
scanning the touch sensor at a second scan rate that is higher than the first scan rate and at one of the first and second resolutions in response to determining that the single touch has remained present for at least the first threshold period $T_1$;
determining that a swipe gesture has occurred at the touch sensor within a second threshold period $T_2$; and
executing an action at the device in response to the swipe gesture.

15. The method in accordance with claim 14, further comprising remaining at the first scan rate and first resolution upon determining that the single touch is not a finger touch.

16. The method in accordance with claim 14, further comprising determining a trajectory of the swipe and determine the swipe to be valid based on the trajectory of the swipe, wherein the trajectory of the swipe includes at least one of a swipe direction and a swipe pattern.

17. The method in accordance with claim 14, further comprising determining that a swipe gesture has not occurred at the touch sensor within the second threshold period $T_2$, and in response returning to the step of scanning the touch sensor of the device at the first scan rate.

18. The method in accordance with claim 14, wherein the action comprises at least one of opening an application on the device, putting the device into at least one of a predetermined input and a predetermined output mode, changing a setting of the device and controlling an operation of the device.

19. The method in accordance with claim 14, further comprising detecting a fingerprint associated with the finger touch via the touch sensor and identifying an individual authorized to use the device based on the detected fingerprint.

20. A mobile electronic communications device having enhanced touch gesture detection and resolution, the mobile electronic communications device comprising:
a touch sensor positioned and configured to sense touch;

a processor linked to the touch sensor and configured to scan the touch sensor at a first scan rate, detect a single touch of a finger while scanning the touch sensor at the first scan rate, determine that the single touch has remained present for at least a first threshold period $T_1$, and in response to determining that the single touch has remained present for at least a first threshold period $T_1$, scan the touch sensor at a second scan rate that is higher than the first scan rate, and determine that a swipe gesture has occurred at the touch sensor within a second threshold period $T_2$ and to execute a predefined action upon determining that a swipe gesture has occurred.

* * * * *